United States Patent
Witte et al.

(10) Patent No.: US 9,618,639 B2
(45) Date of Patent: Apr. 11, 2017

(54) METHOD AND SYSTEM FOR IMAGE-GUIDED FAULT EXTRACTION FROM A FAULT-ENHANCED SEISMIC IMAGE

(71) Applicant: Drilling Info, Inc, Austin, TX (US)

(72) Inventors: Dean Clifford Witte, Aurora, CO (US); Mark Jeffrey Emanuel, Highlands Ranch, CO (US); John Walter Neave, Centennial, CO (US); Christian Winfield Grant, Aurora, CO (US)

(73) Assignee: DRILLING INFO, INC., Austin, TX (US)

( * ) Notice: Subject to any disclaimer, the term of this patent is extended or adjusted under 35 U.S.C. 154(b) by 784 days.

(21) Appl. No.: 13/781,277

(22) Filed: Feb. 28, 2013

(65) Prior Publication Data
US 2013/0229891 A1 Sep. 5, 2013

Related U.S. Application Data

(60) Provisional application No. 61/605,288, filed on Mar. 1, 2012.

(51) Int. Cl.
*G01V 1/34* (2006.01)
*G01V 1/30* (2006.01)

(52) U.S. Cl.
CPC ............. *G01V 1/301* (2013.01); *G01V 1/34* (2013.01); *G01V 1/345* (2013.01); *G01V 1/30* (2013.01); *G01V 2210/65* (2013.01)

(58) Field of Classification Search
CPC .......... G01V 1/30; G01V 1/301; G01V 1/345; G01V 2210/65
USPC .......................................... 367/9, 73; 702/16
See application file for complete search history.

(56) References Cited

U.S. PATENT DOCUMENTS

| | | | |
|---|---|---|---|
| 4,633,400 A | 12/1986 | Chittineni | |
| 5,056,066 A | 10/1991 | Howard | |
| 5,835,882 A | 11/1998 | Vienot et al. | |
| 5,987,388 A | 11/1999 | Crawford | |
| 6,223,126 B1 | 4/2001 | Neff et al. | |
| 7,054,753 B1 | 5/2006 | Williams et al. | |
| 7,069,149 B2 * | 6/2006 | Goff | G01V 1/30 |
| 7,525,349 B2 | 4/2009 | Mavoori et al. | |
| 8,265,876 B1 | 9/2012 | Yu et al. | |
| 2004/0015296 A1 | 1/2004 | Causse et al. | |
| 2004/0220790 A1 | 11/2004 | Cullick et al. | |

(Continued)

OTHER PUBLICATIONS

Aurnhammer et al. "A Genetic Algorithm for Automated Horizon Correlation Across Faults in Seismic Images", IEEE Transactions on Evolutionary Computation, vol. 9. No. 2. Apr. 2005.*

(Continued)

*Primary Examiner* — Ian J Lobo
(74) *Attorney, Agent, or Firm* — DLA Piper LLP (US)

(57) ABSTRACT

A system and method is provided for performing image-guided fault extraction from a fault-enhanced seismic image. The system divides three-dimensional fault-enhanced seismic images into a series of two-dimensional seismic image slices that can be selectively displayed and analyzed for fault surfaces. The system allows a user to select two or more fault surface points in a displayed image slice and identifies a fault path between the first fault surface point and the second fault surface that corresponds to a calculated at least cost path.

16 Claims, 8 Drawing Sheets

(56) References Cited

U.S. PATENT DOCUMENTS

| | | |
|---|---|---|
| 2004/0260476 A1 | 12/2004 | Borgos |
| 2006/0052937 A1 | 3/2006 | Zoraster et al. |
| 2009/0043507 A1 | 2/2009 | Dommisse et al. |
| 2009/0125288 A1 | 5/2009 | Main et al. |
| 2010/0125349 A1 | 5/2010 | Abasov et al. |
| 2010/0214870 A1 | 8/2010 | Pepper et al. |
| 2011/0002194 A1 | 1/2011 | Imhof et al. |
| 2011/0011595 A1 | 1/2011 | Huang et al. |
| 2011/0042098 A1 | 2/2011 | Imhof |
| 2011/0115787 A1 | 5/2011 | Kadlec |
| 2011/0213577 A1 | 9/2011 | Mousavi et al. |
| 2011/0313743 A1 | 12/2011 | Oury et al. |
| 2012/0253770 A1 | 10/2012 | Stern et al. |
| 2013/0090855 A1 | 4/2013 | Rasmus et al. |
| 2013/0229891 A1 | 9/2013 | Witte et al. |
| 2013/0262052 A1 | 10/2013 | Mallet et al. |
| 2014/0254884 A1 | 9/2014 | Elkington et al. |

OTHER PUBLICATIONS

Admasu, Fitsum et al.; "Automatic method for correlating horizones across faults in 3d seismic data;" Computer Vision and Pattern Recognition, 2004, CVPR 2004, Proceedings of the 2004 IEEE Computer Society Conference, vol. 1, 6 pages.*

Ouenes, Ahmed, et al. "Practical use of neural networks in tight gas fractured reservoirs: application to the San Juan Basin." Paper SPE 39968 (1998); (8 pgs.).

Can, Buynamin. Probabilistic performance forecasting for unconventional reservoirs with stretched-exponential model. Diss. Texas A&M University, 2001; (74 pgs.).

PCT International Preliminary Report on Patentability of PCT/US13/34546; dated Oct. 7, 2014; (12 pgs.).

PCT International Preliminary Report on Patentability of PCT/US13/68348; dated May 5, 2015; (5 pgs.).

PCT International Preliminary Report on Patentability of PCT/US13/70838; dated May 26, 2015; (6 pgs.).

PCT International Search Report of PCT/US13/68349; dated Jan. 30, 2014; (3 pgs.).

PCT Written Opinion of the International Searching Authority of PCT/US13/68349; dated Jan. 30, 2014; (5 pgs.).

PCT International Search Report of PCT/US13/70838; dated Apr. 9, 2014; (3 pgs.).

PCT Written Opinion of the International Searching Authority of PCT/US13/70838; dated Apr. 9, 2014; (5 pgs.).

PCT International Search Report of PCT/US13/68348; dated Apr. 29, 2014; (3 pgs.).

PCT Written Opinion of the International Searching Authority of PCT/US13/68348; dated Apr. 29, 2014; (4 pgs.).

PCT International Search Report of PCT/US14/34546; dated Sep. 22, 2014; (3 pgs.).

PCT Written Opinion of the International Searching Authority of PCT/US14/34546; dated Sep. 22, 2014; (8 pgs.).

E. W. Dijkstra; "A Note on Two Problems in Connexion with Graphs" dated Jun. 11, 1959; pp. 269-271; (3 pgs.).

Coleou, et al.; "Unsupervised Seismic Facies Classification: A Review and Comparison of Techniques and Implementation" dated Oct. 2003; pp. 942-953; (7 pgs.).

Andersen, et al.; "Seismic Waveform Classification: Techniques and Benefits," Dated Mar. 2004; pp. 26-29; (4 pgs.).

Castro de Matos, et al. "Unsupervised Seismic Facies Analysis Using Wavelet Transform and Self-Organizing Maps" dated Dec. 13, 2006; vol. 72, No. 1, pp. P9-P21, 19 Figs.; (13 pgs.).

Jeong, et al.; "A Fast Iterative Method for Eikonal Equations" dated Jul. 23, 2008; vol. 30, No. 5, pp. 2512-2534; (23 pgs.).

Roy, et al.; "Automatic Seismic Facies Classification with Kohonen Self Organizing Maps—a Tutorial" dated Dec. 2010; pp. 6-14; (9 pgs.).

Hollt, et al.; "Interactive Seismic Interpretation with Piecewise Global Energy Minimization" dated Mar. 1, 2011; pp. 5966; (8 pgs.).

Diersen et al.; "Classification of Seismic Windows Using Artificial Neural Networks" dated 2011; pp. 1-10; (10 pgs.).

Watson, A. Ted, et al. NMR characterizations of properties of heterogeneous media. Research Report, Final Report. US Department of Energy, DOE Award No. DE-AC26-99BC15202, Texas A&M University, Jan. 2005., pp. 1-151; (151 pgs.).

Vander Valk, P.A., and P. Yang. "Investigation of key parameters in SAGD wellbore design and operation." Journal of Canadian Petroleum Technology 46.6 Jun. 2007: 49-56; (8 pgs.).

Hintze, J.L. (2007), NCSS Data Analysis User's Guide III, Regression and Curve Fitting. NCSS 2007. Retrieved from http://ness.wpengine.netdna-cdn.com/wp-content/uploads/2012/09/NCSSUG3.pdf, pp. 1-653; (653 pgs.).

Wikipedia. Wikipedia, Overfitting. Revision from Aug. 23, 2012. pp. 1-3. Retrieved from http://en.wikipedia.org/w/index.php?title=Overfitting&oldid=508784472; (3 pgs.).

Brown et al., *Seismic Event Tracking by Global Path Optimization*, 76th Annual International Meeting, SEG, Expanded Abstracts, 1063-1067, 2006 (4 pgs).

Kass et al., *Snakes: Active Contour Models*, International Journal of Computer Vision, 321-331, 1988 (11 pgs).

Mortensen et al., *Interactive Segmentation with Intelligent Scissors*, Graphical Models and Image Processing, 60(5):349-384 (1998) (48 pgs).

Pages from Website: http://www.neuralog.com/pades/NeuraLog.html, printed Dec. 3, 2015 (2 pgs).

W. Welch, A. Witkin, *Free Form Shape Design Using Triangulated Surfaces*, Computer Graphics, 28, Proc. SIGGRAPH '94, 1994 (preprint) (10 pgs).

* cited by examiner

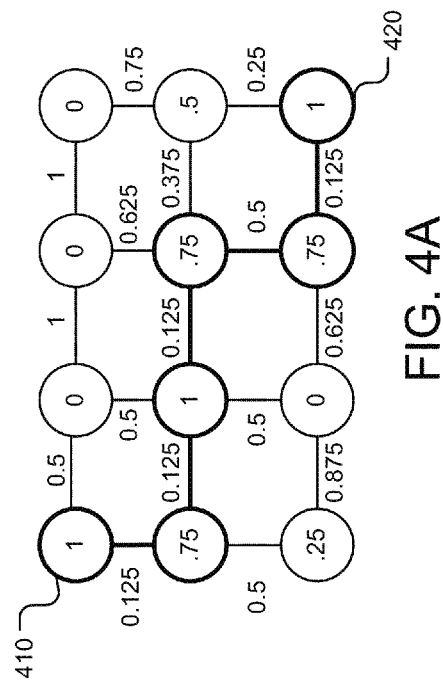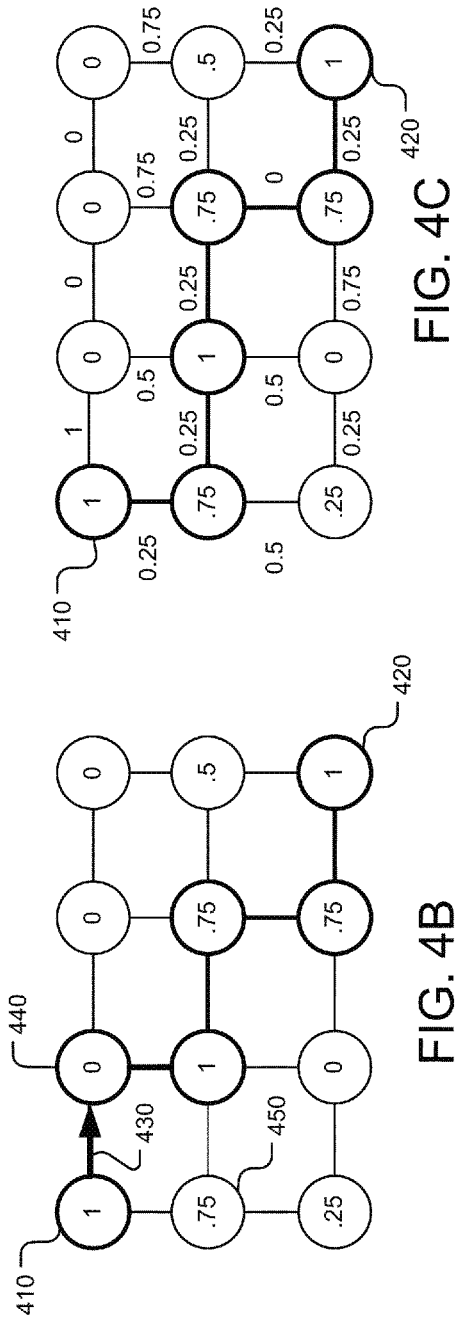
FIG. 4A
FIG. 4B
FIG. 4C

METHOD AND SYSTEM FOR IMAGE-GUIDED FAULT EXTRACTION FROM A FAULT-ENHANCED SEISMIC IMAGE

CROSS-REFERENCE TO RELATED APPLICATIONS

This application claims priority under 35 U.S.C. §119(e) to provisional patent application No. 61/605,288 titled "Process for Image-Guided Fault Extraction from a Fault-Enhanced Seismic Image" filed on Mar. 1, 2012 and which is hereby incorporated by reference herein.

FIELD OF THE DISCLOSURE

Aspects of the present disclosure relate to a system and process for interpreting faults from fault-enhanced seismic images. More particularly, aspects of the present disclosure involve a computing system configured to assist an analyst to rapidly and accurately identify and model geologic fault surfaces in two-dimensional and three-dimensional fault-enhanced seismic images.

BACKGROUND

Horizons and faults are fundamental geologic features that describe the geology, geometry, and topology of the subsurface of the earth. Faults compartmentalize the subsurface and are indicators of deformation over geologic time. Faults can act as permeable conduits or impermeable seals affecting the flow of subsurface fluids and gases. Thus, the understanding of faults in an area is often useful for the prospecting of oil and natural gas. Furthermore, seismologists are also tasked with identifying geologic fault hazards that are dangerous when drilling and extracting oil and natural gas. Hence, rapid and accurate mapping of geologic faults has high economic and safety value.

There are a variety of methods used for producing images that outline subsurface terrain. One technique that is often used involves radiating energy into the ground and measuring the reflections at various sensors. This imaging technique is referred to as the seismic method. Using the data acquired by the seismic method, three-dimensional seismic images of the underground geology, geometry, and topology can be created. Generally, fault lines are depicted in these seismic images by visible lines. Thus, a seismologist may study these lines to determine fault locations for use in prospecting.

Various methods have been developed and used to analyze three-dimensional seismic images. For example, the coherence cube method was developed to enhance fault features in seismic images. The coherence cube method in turn has lead to a variety of methods for extracting, or interpreting, fault traces or surfaces from fault-enhanced seismic images. These methods tend to be done manually. Manual fault interpretation is usually performed by a trained geologist manually identifying image points that correspond to particular faults and interpolating these points with smooth curves or surfaces, independent of the fault image. High fidelity fault curves or surfaces can be produced only by manually identifying numerous fault points in the fault image. Manual interpretation of geological faults in seismic images is a tedious, error-prone and largely non-reproducible process.

The problems associated with manual fault interpretation and the rise in computing power has led to the introduction of various automated methods for performing fault interpretation. One method for automatically processing a fault-enhanced three-dimensional seismic image is described in U.S. Pat. No. 5,987,388 to Crawford et al. In the method of Crawford, individual two-dimensional slices of a three-dimensional seismic image are processed in an attempt to trace fault lines. This method is not conducive to interpreter control of the extracted surfaces and tends to create false positive surfaces from the edges of the seismic survey and from geologically unreasonable coherent noise in the image. The extracted models, being cluttered with false fault surfaces, are frequently not useful to analysts.

Since faults quite often occur in and cause noisy images, a mixture of manual and automated interpretation is required. What is needed is a semi-automated computer-based process that reduces the time consuming nature of fault interpretation, while simultaneously increasing the fidelity and reproducibility of the extracted fault surfaces, and at the same time allowing an analyst to manually interpret and modify the automatically extracted curves and surfaces in regions of poor image quality.

One method for extracting curves in 2-D images is to use a shortest path algorithm. This method, variously known as "Intelligent Scissors" or "Livewire", has proven useful for image segmentation in the commercial product Photoshop®. It has not, however, previously been employed for fault interpretation of seismic images.

It is with these and other issues in mind that various aspects of the present disclosure were developed.

SUMMARY

According to one aspect, a method is provided for performing image-guided fault extraction from a fault-enhanced seismic image using at least one processor. The fault-enhanced seismic image includes a plurality of image slices. The method includes displaying a fault-enhanced seismic image and receiving a selection of a particular image slice of the plurality of image slices from a user. The method also includes displaying the particular image slice and receiving a first input designating a first fault point in the particular image slice and receiving a second input designating a second fault point in the particular image slice. The method also includes defining a fault path between the first fault point and the second fault surface that corresponds to a calculated least cost path. The method further includes generating the fault path for display.

According to another aspect, a system is provided for performing image-guided fault extraction from a fault-enhanced seismic image. The system includes a data source that stores a plurality of fault-enhanced seismic images. Each of the plurality of fault-enhanced seismic images includes a plurality of image slices. The system includes at least one processor and an application executable by at least one processor. The executed application displays a selected one of the plurality of fault-enhanced seismic image. The executed application also receives a selection of a particular image slice of plurality of image slices from a user and displays the particular image slice. The executed application also receive a first input designating a first fault point in the particular image slice and receives a second input designating a second fault point in the particular image slice. The executed application further identifies a fault path between the first fault point and the second fault point that corresponds to a calculated least cost path and generates the fault path for display.

BRIEF DESCRIPTION OF THE DRAWINGS

FIG. 4A-C depict example data points and distances between those data points using various weighting algorithms in accordance with the present disclosure

DETAILED DESCRIPTION

Implementations of the present disclosure involve a system and method for performing image-guided fault extraction from a fault-enhanced seismic image. In particular, the present disclosure provides for a system and method that divides three-dimensional fault-enhanced seismic images into a series of two-dimensional seismic images and then provides for a semi-automated system for performing fault extraction. This may be accomplished through the use of semi-automatic, or guided, extraction of features indicative of geologic faults in fault enhanced seismic images. This semi-automated system reduces the time required for the interpretation of fault images, while also increasing the accuracy and reproducibility of extracted fault surfaces.

Figure 1:
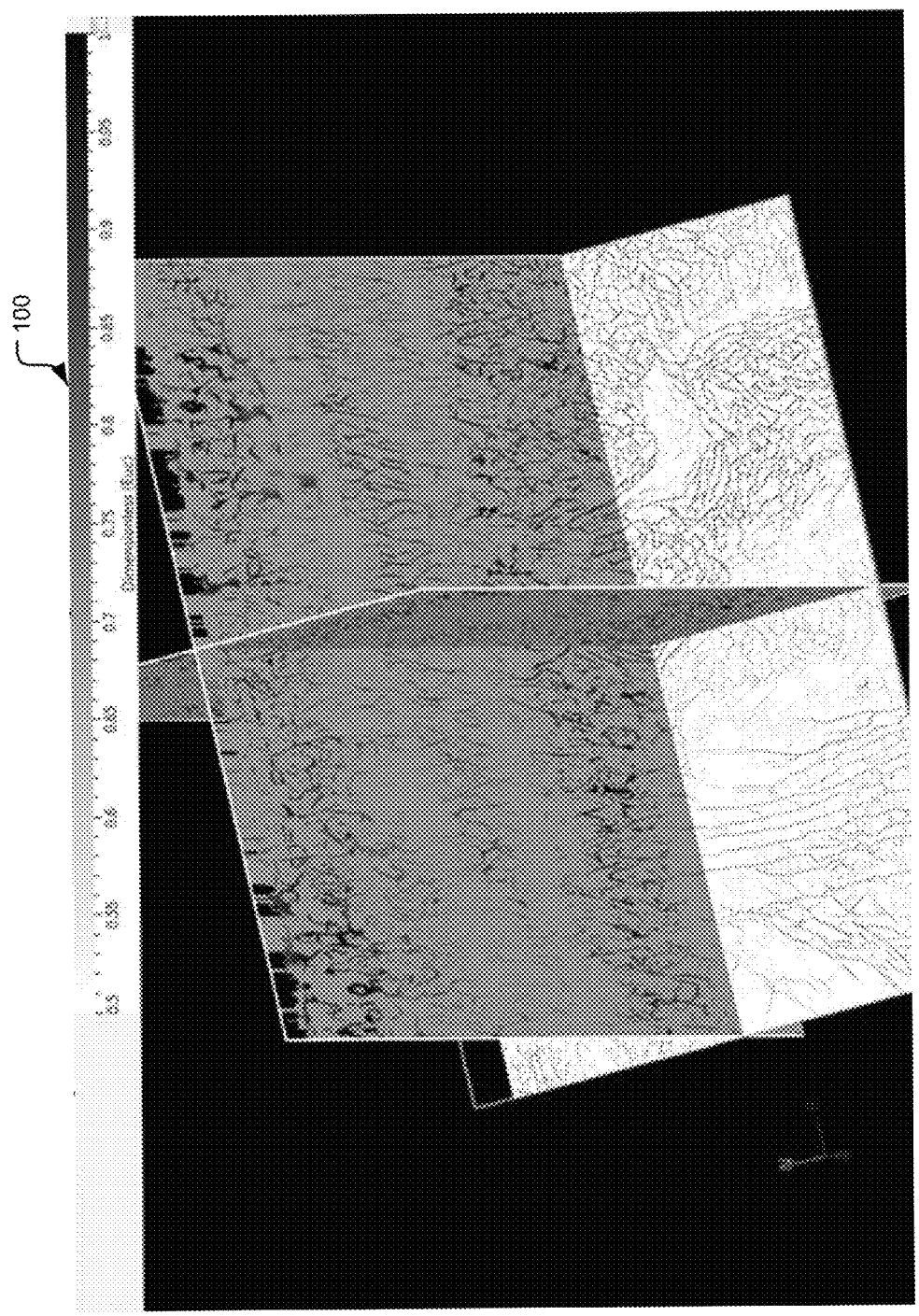
FIG. 1 depicts an example of a three-dimensional fault enhanced seismic image.

Referring to FIG. 1, an example three-dimensional fault-enhanced seismic image is depicted. The three-dimensional fault-enhanced seismic image is essentially a plurality of data samples from a three-dimensional space. These data samples are then mapped to colors or shades and are used to show a physical attribute throughout the three-dimensional space. In this example, the dark curves on the image indicate the intersection of fault surfaces with each plane of the image.

Image-guided fault extraction allows for an interactive method of creating smooth surfaces that are aligned with fault features from three-dimensional fault-enhanced seismic images retrieved from, for example, a database or other three-dimensional fault-enhanced seismic image data source. The fault-enhanced seismic image may be created using any known methodology. According to one aspect, as discussed above, the coherence cube method, such as described above, can be used to create the three-dimensional fault-enhanced seismic image. It is contemplated, however, that other fault-enhanced seismic image generation methods or techniques maybe used. Thus, the fault-enhanced seismic image includes a large plurality of data points mapped onto a three-dimensional coordinate system where the shade of each pixel represents a data and the location of the pixel is representative of a location in the ground.

Figure 2:
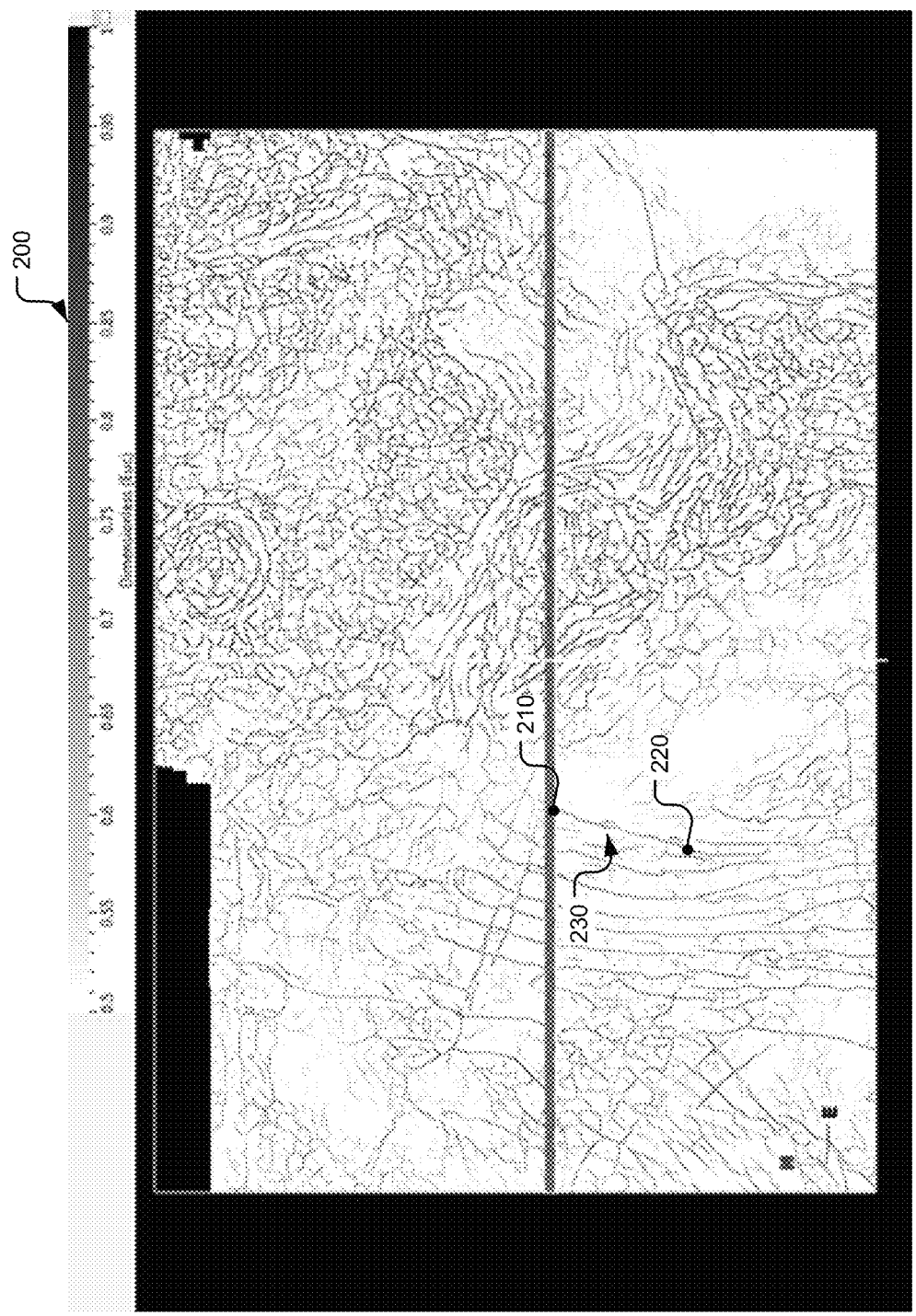
FIG. 2 depicts a horizontal slice from the 3-D fault image shown FIG. 1.

In order to facilitate the analysis of the three-dimensional fault-enhanced seismic image 100, the three-dimensional fault-enhanced seismic image 100 may be divided into a series of horizontal slices, each slice corresponding to a two-dimensional representation of a surface at a specified depth or time. Referring now to FIG. 2, a two-dimensional slice 200 of the three-dimensional fault-enhanced seismic image 100 is depicted. Again, each pixel in this image has a shade representative of a data value and the location in the image represents a physical location in the slice. The three-dimensional fault-enhanced seismic image may be sliced in any way. For example, three-dimensional fault-enhanced seismic image may be sliced into two-dimensional slices at each height in the image. Similar to in FIG. 1, the dark curves depicted are the intersection of fault surfaces with the plane of the image.

Figure 3:
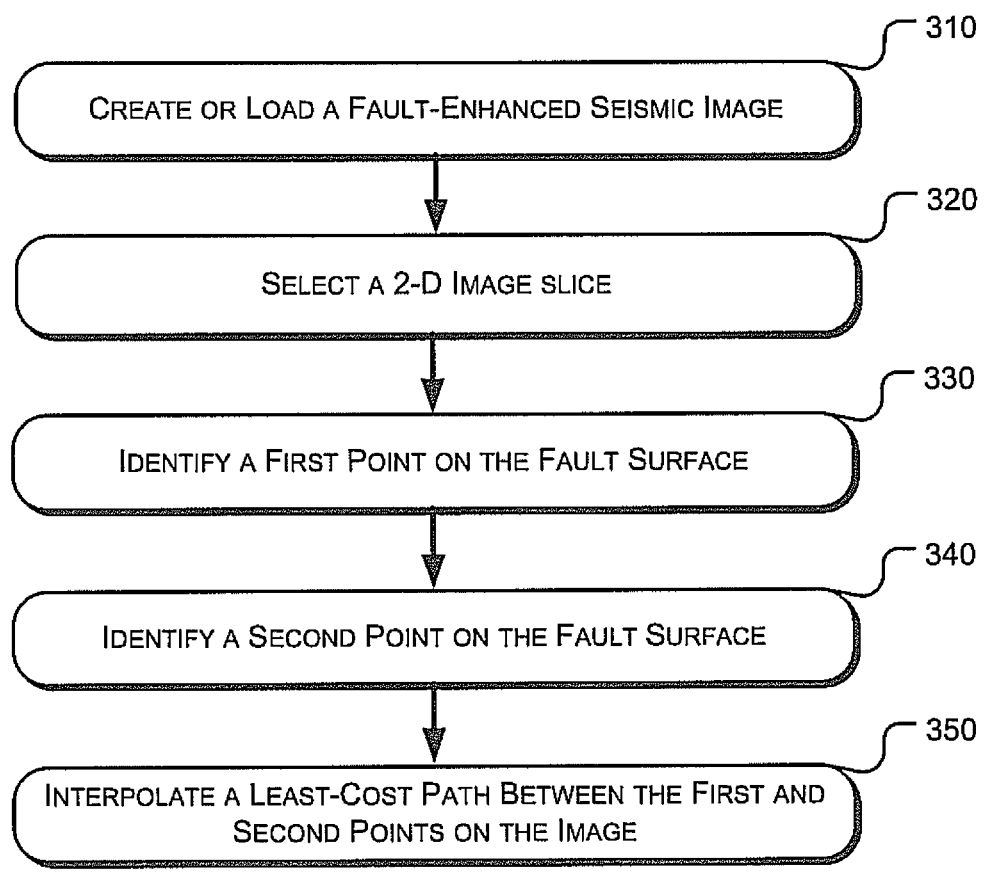
FIG. 3 depicts a block diagram outlining an example method for performing image-guided fault extraction from a fault-enhanced seismic image in accordance with the present disclosure.

Referring now to FIG. 3 and with continued reference to FIGS. 1 and 2, a method for image-guided fault extraction from a fault-enhanced seismic image is depicted. In this example method, a fault-enhanced seismic image may either be provided or the system may be in electronic communication with the appropriate equipment for acquiring or creating a fault-enhanced seismic image (operation 310). If the provided fault-enhanced seismic image is a three-dimensional image, then the image-guided fault extraction may slice the three-dimensional image into a series of two-dimensional image slices for analysis (operation 320). For example, two-dimensional (2-D) image slice may be selected according to a user input designating a specific depth or depths for analysis. The selected 2-d image slice may be horizontal, as above, vertical or any other orientation.

According to one aspect, as described in more detail below, the user interacts with an input form to select particular axis of the fault-enhanced images that correspond a particular image slice. According to one aspect, the user may interact with an input form via a graphical user interface displayed via a computing device to enter x, y, and z coordinates in the image. According to another aspect, the user may interact with the input form via the graphical user to enter x and y, coordinates in the image and a specified time, t.

Although users may select slices along the cardinal directions of the cube, user selections are not restricted to that direction. Advantageously, the present system permits users to create and interpret on planar slices of any orientation. Users are enabled to select slices perpendicular to the predominant strike of the fault they are interpreting or a constant-time (or -depth) slice.

In another example, the system may start at one of the end of the three-dimensional image and iterate through each two-dimensional slice of the three-dimensional image. In yet another example, the system may randomly or semi-randomly sample slices from the three-dimensional image in order to minimize the number of computations made.

After a two-dimensional slice has been selected for analysis, a first point and second point on a fault surface on the two-dimensional slice may be selected for fault extraction (operations 330, 340). For example, the user uses an input device, such as a mouse, to pan across and/or zoom in and out of the two-dimensional slice image being displayed, for example, on a computer monitor, and to position a mouse pointer at a first voxel or pixel location in the image. The user then selects (e.g., double clicks) this first location, which is marked by an X, circle, square, or other displayable element that identifies a selected point. The user then uses the input device to pan across and/or zoom in and out of the two-dimensional slice image and selects on a second voxel or pixel location in the image, which is marked by an X, circle, square, or another displayable element.

According to anther aspect, a selection assist line is generated and used to select the first and second points. In this example, the user may use the same technique to select points, but only selects points that are recognized as being on the generated selection assist line. Furthermore, the selection assist line can be used to assist the user in connecting the first and second points, in a way that the interpolating curve follows the ridges in the image. If the ridges are very curved, the shortest weighted path between two points may not actually follow the ridge. The user can recognize such curvature and add the second point such that the interpolating curve does indeed follow the ridge, and then add a third point on the ridge, etc. The first and second points may be selected according to any criteria and may be selected by a user or automatically by the system. More specifically, the first and second points are selected such that each of the points is on the same fault surface on the two-dimensional slice. Referring back to the two-dimensional slice 200 depicted in FIG. 2, a user may identify a first point 210 and a second point 220 points on the same single fault line 230.

Once the points on a fault surface have been selected, the system may interpolate values to create a fault curve between the first and second fault points 210, 220. This interpolated curve provides an accurate estimation of the location of the fault surface. The interpolation may be performed by determining the "shortest path" between the two points (operation 350). In this case, determining the shortest path involves analyzing the image to determine a path that is the easiest or least geographically costly path between the first and second fault points 210, 220.

In various embodiments of the present disclosure, determining the shortest path between two points on a fault line may be calculated using a shortest path algorithm. In order to use a traditional shortest path algorithm each data point in the image may be inputted into a graph-like data structure with each node in the graph corresponding to data point in the two-dimensional image that is connected to neighboring nodes by weighted edges. Before a shortest path can be found, the weights of the edges must be determined. The weights of the edges may be determined using one or more weighting algorithms. For example, the weights may be determined by finding geometric or geodesic distance between two data points, by using the difference in orientation between the edges and the local orientations of the image, or by comparing the similarity of data point.

The edge weighting method used may be determined according to a user selection, a user preference, or may be automatically determined by the system. For example, if the edge weights (e.g., geodesic distance) between two nearby points are low, both points have high fault likelihood and (optionally) if the orientation of the edge between the two points is aligned with the predominant orientation of the fault, as determined by the orientation of the image at the points. As another example, if the edge weights (e.g., geodesic distance) between two nearby points are high, both points have low fault likelihood. Once the edges have been weighted to represent distances between data points, the shortest path may be determined. To find the shortest path between the first fault point 210 and the second fault point 220 any shortest path algorithm may be used. For example, Dijkstra's algorithm or eikonal equations may be used to determine the shortest path. The term "geodesic distance" is used herein to refer to a distance between two points in an image which takes into account image content. For example, in the embodiments described herein the geodesic distances take into account intensity gradients of the image elements (i.e., pixels) an image. However, it is also possible to use geodesic distances which take into account gradients of other sources of information, such as texture gradients, color gradients, or gradients of probability maps.

If a user selects for the system to determine the shortest path by using the geometric or geodesic distance an edge-weight or distance between each data point may be calculated based on how likely to be part of a continuous fault. For example, the geodesic distance between data point values may correlate with a fault, while some data point difference values may be known to correlate with not being part of a fault. In one example, the system may be configured so that the shorter a distance is between two data points, the more likely the points are part of a fault.

In this example, each data point may have a value ranging from zero to one and values that are closer to one are known to correlate more to faults than values that are further than one. In this case, a distance function may be:

$$c = 1 - \frac{(p+q)}{2}. \tag{1}$$

In this case, c is the weighted distance between neighboring sample points with fault values p and q, respectively. As used herein, neighboring sample points refer to, for example, adjacent voxels in an image. Using this or a similar equation, the system may start at any point and iterate through every data sample point in the two-dimensional slice along possible paths between the first and second fault points and determine the distance between every point and the points neighboring point. The total weighted distance between the first and second fault points may be the cumulative weighted distances between all of the points in a path. Thus, once the connection costs are known for each path, the system may then iterate through all of the possible paths between the first fault point and the second fault point to identify the path that minimizes connection costs (i.e., has the lowest sum of weights)

Any potential shortest path algorithm may be utilized to find the shortest path between the first fault point and the second fault point. For example, the system may be configured to determine a path length for every possible path between the first and second fault points and then return the shortest path. In other examples, the system may be configured to skip paths that are unlikely to yield the shortest path.

In another embodiment, the weighted distances between data points may depend on the difference in orientation between the local orientation of the two-dimensional image and a direction vector connecting two adjacent sample data points (e.g., see direction vector 430 in FIG. 4B). Thus, the weighted distance between two adjacent pixels (e.g., sample data points) may depend on both the pixel values and their orientation relative to the local image orientation. The local orientation of the image may be computed from the gradient structure tensor, while the direction vector may be a vector that connects adjacent pixels. Thus the weighted distance between two adjacent pixels may depend on both the pixel values and their orientation relative to the local image slice orientation. The difference may be calculated such that the more aligned the two orientations are, the lower the connection cost is between two samples, while the less aligned the two orientations are, the higher the connection cost between the samples. Again, once the connection costs between each sample are known, any relevant shortest path algorithm may be used to find the shortest distance between the first and second fault points.

In another example, the distances between data points may depend on the difference in value between neighboring samples. In this example, the more similar the two samples, the lower the connection cost between the two samples. The values at each data point may be subtracted and the distance between the points may be set to the absolute value of the difference. Again, once the distances between data points are known, any relevant shortest path algorithm may be used to find the shortest distance between the first and second fault points.

Referring now to FIGS. 4A-C, an example simplified collection of sample points is depicted in order to show the described distance algorithms. In this example, this two-dimensional slice only has twelve data points each with a value ranging from zero to one and are connected to data points that are to the left, right, above, and below the data point. It should be understood that FIGS. 4A-C are being used to demonstrate the various weighting methods described above and that, in practice, the two-dimensional images being analyzed usually contain significantly more data points.

In these examples, the shortest path has been designated using a bolded outline. FIG. 4A depicts a graph with node distances determined using the geodesic distance between each pair of connected data points using Equation 1 (above). The distance between each node has been calculated and then the overall shortest path has been determined based on the total distance between points 410 and 420. In this case, the shortest path travels through four data points and has a total distance of one.

Referring now to FIG. 4B, the system is responsive to image orientation to bias connection costs between sample points. For example, sample points in image slices for some regions may be difficult to discern visual differences due to, for example, noise in the image. As a result, without biasing, the system would likely determine the shortest path between two selected points to correspond to a straight line. However, the present system enables a user to leverage larger scale patterns observed in the image to determine a local average orientation of the image.

According to one aspect, the local orientation of the image may be computed from the gradient structure tensor. The system enables a user to input a bias factor to add or multiply to calculated edge weights between neighboring sample points in the image slice to determine a more accurate fault path between selected fault points. In other words, in this aspect, the edge weight is determined as function of pixel values and bias data supplied by the local image orientation.

For example, assume the same distances between sample points and that orientation vector 430 connects two adjacent sample data points 410-440. Although the values associated with sample point 440 and a sample point 450 indicate a shorter distance between point sample point 410 and 450 without biasing, due to biasing the shortest path will include a connection between point 410 and point 440. Thus, the weighted distance between two adjacent pixels (e.g., sample data points) may depend on both the pixel values and their orientation relative to the local image orientation.

Referring now to FIG. 4C, the system may calculate the connection cost between each sample by taking the difference between each pair of samples. That is, the path is not determined based on total overall distance, but rather the distance between each of the adjacent sample points determines the path In this case, the shortest distance also follows the same path as in FIG. 4A.

In various embodiments, a combination of two or more weighting algorithms may be used in conjunction to determine distances between samples. In these examples, the connection costs may be aggregate value of the connection costs determined by the chosen two or more of the above algorithms. For example, referring again FIGS. 4A-C, the connection costs between samples may include the total connection costs using each of the above algorithms.

Figure 5:
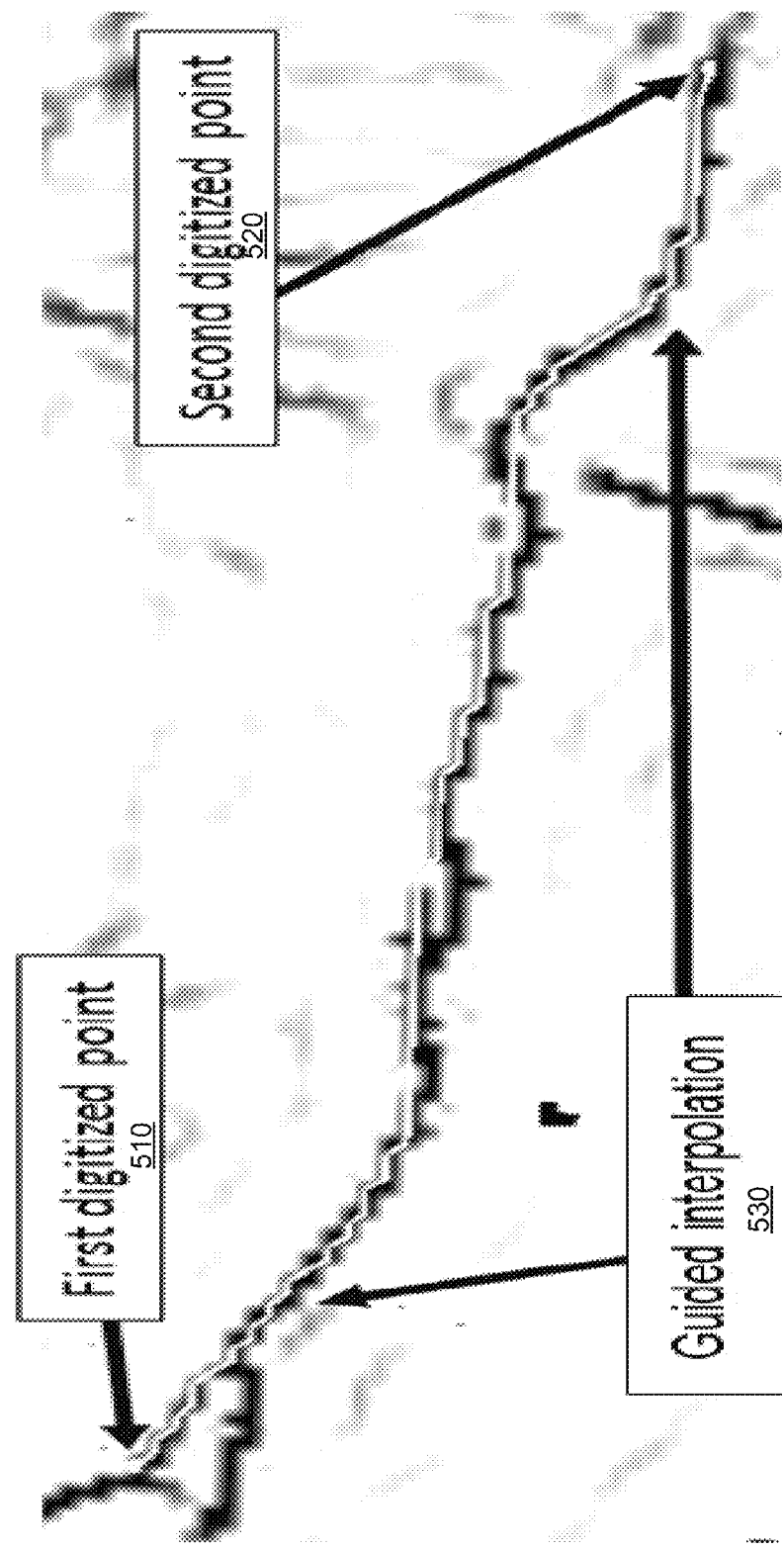
FIG. 5 depicts an interpolated fault path on a horizontal slice that was derived in accordance with the present disclosure.

Referring now to FIG. 5, an example of a two-dimensional slice of a three-dimensional fault-enhanced seismic image is depicted. In this example, a first fault point 510 and a second fault point 520 were selected and the resulting least cost path 530 between the points was interpolated. In this example, the least cost path 530 provides a close approximation of the dark fault line depicted.

Figure 6:
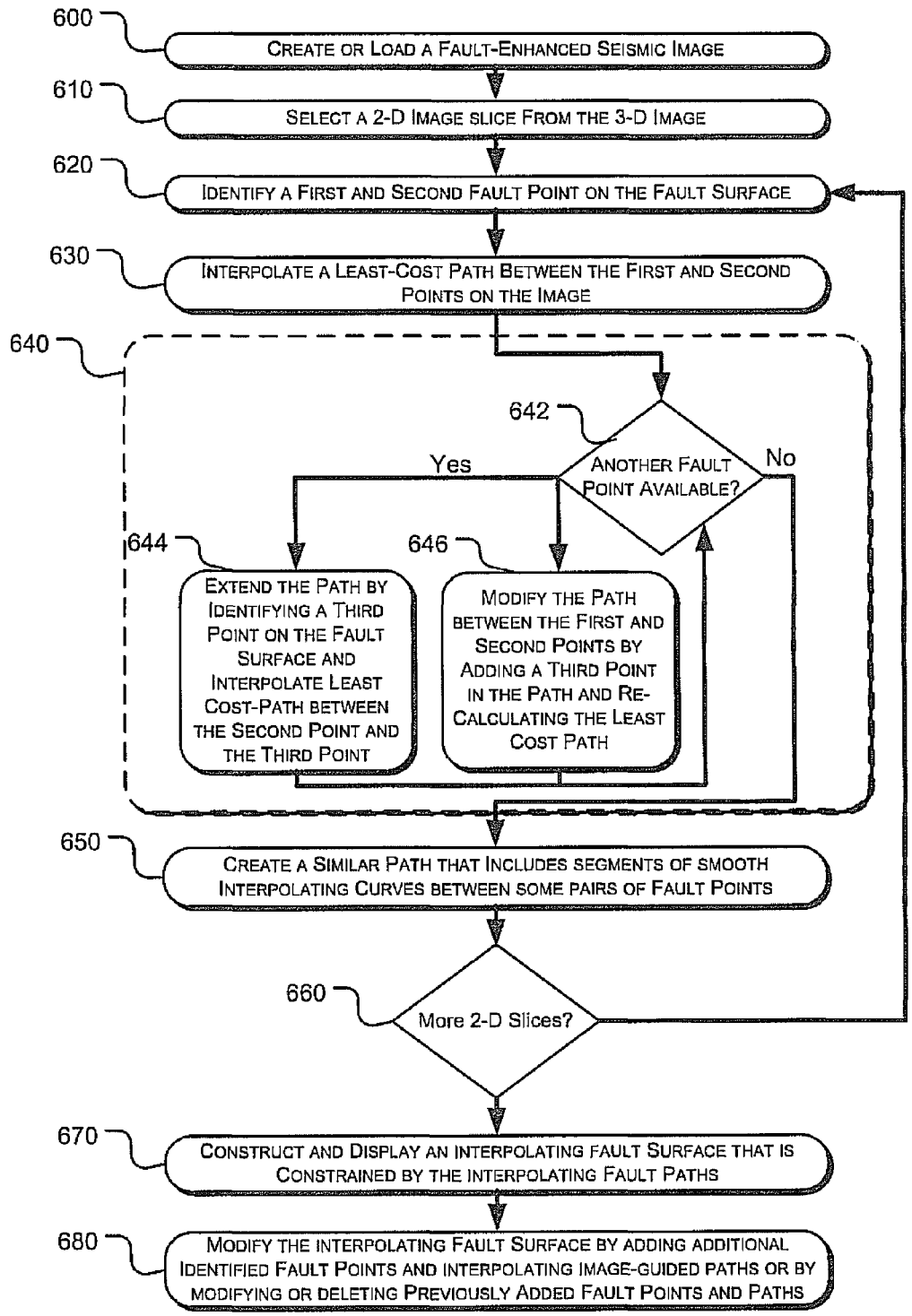
FIG. 6 depicts a block diagram outlining an example method for performing image-guided fault extraction from a fault-enhanced seismic image in accordance with the present disclosure.

Referring now to FIG. 6, an additional embodiment of a method for image-guided fault extraction is depicted. In this example, a fault-enhanced seismic image may be created or loaded (operation 600). Again, the fault-enhanced seismic image may be created using any method creating a fault-enhanced seismic image, and the system may be in electronic communication with any equipment required for creating the fault-enhanced seismic image so that it may send commands to the equipment and receive any data from the equipment. Once the three-dimensional fault-enhanced seismic image has been created or retrieved, a two-dimensional slice of image may be selected by a user or automated process (operation 610). A first fault point and a second fault point on a fault surface may then be selected (operations 620) A least cost path may then be interpolated between the first and second fault points by first using one or more of the above described weighting algorithms to determine distances between data points and then applying a shortest path algorithm to interpolate the fault (operation 630).

In this example, one or more additional fault points may be available for performing further analysis. For example, a user or automated process may select one or more additional fault points on the same fault surface as the first and second fault points. In some cases, the system may prompt the user that more fault points are required. For example, if there are multiple shortest paths available, the system may prompt the user to select another fault point so that the correct path can be interpolated.

In other cases, additional fault points may be selected to allow for the extension of the interpolated least cost path or additional fault points may be added between the first and second fault points in order to modify the least cost path. In the depicted example method, the system is configured to allow for the modification of the least cost path according to one or more additional fault points (operation 640). The system may first check to see if any additional fault points have been provided (operation 642). After interpolating a path, the system may display the interpolated path overlaid on the two-dimensional image slice and prompt the user about whether they would like to add any additional fault points. If another fault point has been selected or is otherwise available, a user may select whether the additional fault point will be used to extend the interpolated path or to modify the interpolated path. In another example, the system may automatically analyze the location of additional fault point and evaluate whether the interpolated path should be extended or modified according to the location of the third fault point relative to the first fault point, the second fault point, and/or the interpolated path.

If the additional fault point is for extending the interpolated path, then using one or more of the weighting methods described above, the interpolated path may be extended from the first fault point to the additional fault point or from the second fault point to the additional fault point (operation 644). If the additional fault point is added for modifying the interpolated path, the path is modified such that it includes the shortest interpolated path between the first fault point and the additional fault point and the shortest interpolated path between the additional fault point and the second fault point (operation 646). Again, the modification may utilize one or more of the weighting methods described above in conjunction with a conventional shortest path algorithm. After either an extended path or a modified path has been interpolated additional fault points may be entered or selected and the process may be repeated until a satisfactory interpolated path has been determined.

Figure 7:
FIG. 7 depicts an interpolated fault path along with similar paths on a horizontal slice that was derived in accordance with the present disclosure.

After an interpolated path has been created, the system may create a similar path (e.g., see FIG. 7) using segments of smooth interpolating curves between some pairs of fault points (operation 650). For example, the system creates a refined interpolated smooth surface curve by fitting a smooth surface (or curve in 2-D) to the fault points and previously interpolated or surface curves. Thereafter, the system automatically slices the image volume in directions that are approximately perpendicular to the interpolated smooth surface curve. For each slice, the system further interpolates between the intersections of the previously interpolated curves with that slice, using the image to guide the interpolation according to a shortest path algorithm. A user can repeatedly initiate this interpolation process until satisfied with the quality of the surface or until the surface has been sampled to the same resolution as the image.

Alternatively, the system can be configured to compute the weighted path length along the smooth surface, between the intersections of previously interpolated curves, and choose to automatically interpolate between the intersections only if the weighted distance along the sampled curve exceeds some threshold. Thus the system can selectively improve the quality of the extracted surface by working only on slices that have the worst correspondence between the smooth surface and the fault-enhanced image.

This process may then be repeated for each two-dimensional slice in the three-dimensional image (operation 660). After the entire image has been processed, the system may construct and display an interpolating fault surface that is constrained by the interpolating fault paths (operation 670). These interpolating fault surfaces may then be modified by adding additional fault points and interpolating additional fault paths or by deleting or modifying previously interpolated paths (operation 680).

Figure 8:
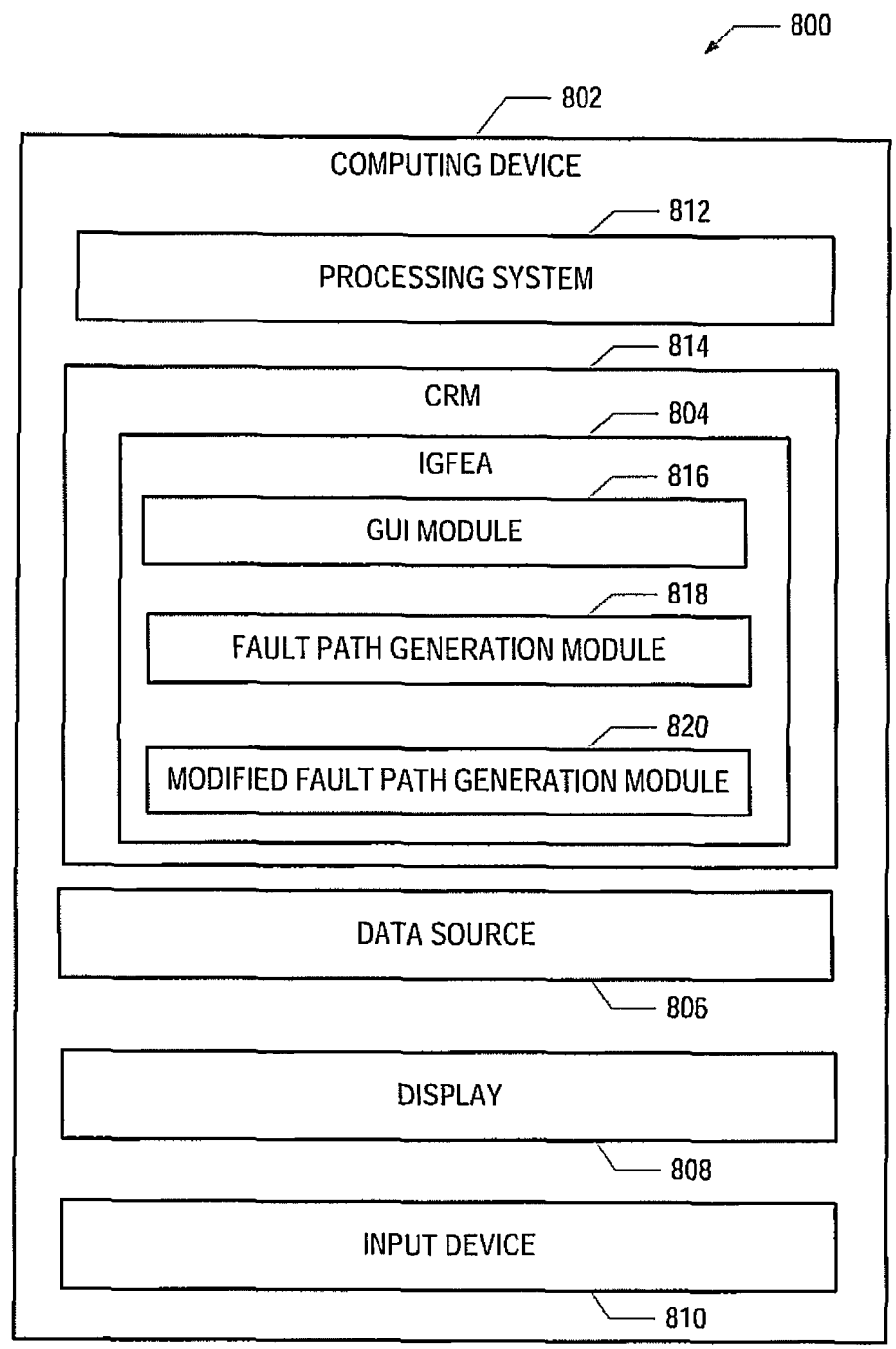
FIG. 8 is a block diagram illustrating an example of a general purpose computing system that may be used in the application of the present disclosure.

FIG. 8 depicts an exemplary image-guided fault extraction system (IGFES) 800 in accordance with aspects of the invention. The IGFES 800 includes a computing device 802 or other computing device or system that includes an image-guided fault extraction application (IGFEA) 804. The IGFES 800 also includes a data source 806 that stores three-dimensional fault-enhanced seismic images. Although the data source is illustrated as being located on the computing device 802, it is contemplated that the data source 806 may be a database that is located on another computing device or computing system that is connected to the computing device 802.

The computing device 802 can be a laptop computer, a personal digital assistant, a tablet computer, standard personal computer, or another processing device. The computing device 802 includes a display 808, such as a computer monitor, for displaying data and/or graphical user interfaces. The computing device 802 may also include an input device 810, such as a keyboard or a pointing device (e.g., a mouse, trackball, pen, or touch screen) to interact with various data entry forms to submit image slice selection data and/or surface fault point input data.

According to one aspect, a displayed fault-enhanced seismic image is itself an entry form that is responsive to user input. For example, the user of the computing device 802 can interact with fault-enhanced seismic image to submit image slice selection data by using the mouse to select a particular region of the fault-enhanced seismic image. It is also contemplated that the user may submit image slice selection data by interacting with one or more displayed fields (not shown) to enter coordinates corresponding to a particular image slice. After entering the submit image slice selection data, an image slice selection request is generated and provided to the IGFEA 804 for processing.

According to one aspect, a displayed image slice is itself another entry form that is responsive to user input. For example, the user of the computing device 802 can interact with the displayed image slice to submit surface fault point input data by using the mouse to select at least two particular points on the image slice. It is also contemplated that the user may submit surface fault point input data by interacting with one or more displayed fields (not shown) to enter coordinates corresponding to each of the at least two particular points. After entering the surface fault point input data, a fault path identification request is generated and provided to the IGFEA 804 for processing.

Although the IGFES 800 is depicted as being implemented on a single computing device, it is contemplated that in other aspects the IGFEA 804 may be executed by a server computing device (not shown) that receives the image slice selection request, the fault path identification request, and/or other input data from a remote client computer (not shown) via a communication network, such as the Internet.

According to one aspect, the computing device 802 includes a processing system 812 that includes one or more processors or other processing devices. The computing device 802 also includes a computer readable medium ("CRM") 814 configured with the IGFEA 804. The IGFEA 804 includes instructions or modules that are executable by the processing system 812 to perform interpretation on faults from fault-enhanced seismic images.

The CRM 814 may include volatile media, nonvolatile media, removable media, non-removable media, and/or another available medium that can be accessed by the computing device 200. By way of example and not limitation, the CRM 814 comprises computer storage media and communication media. Computer storage media includes nontransient memory, volatile media, nonvolatile media, removable media, and/or non-removable media implemented in a method or technology for storage of information, such as computer readable instructions, data structures, program modules, or other data. Communication media may embody computer readable instructions, data structures, program modules, or other data and include an information delivery media or system.

A GUI module 816 displays a fault-enhanced seismic image received from, for example, the data source 806 in response to a fault-enhanced seismic image retrieval request. The fault-enhanced seismic image retrieval request is generated, for example, by a user of the computing device 802 interacting with an image retrieval request from (not shown).

The fault-enhanced seismic image can be displayed as described in connection with operations 310 and 320 of FIG. 3.

As described above, the fault-enhanced seismic image can be segmented or divided into image slices. The GUI modules 816 displays a particular image slice, such as described above in connection with operation 320 of FIG. 3, in response to an image slice selection request.

A fault path generation module 818 generates a curve that corresponds to the "shortest path" between at least two points selected in the particular image slice in response to a fault path identification request. The at least two points corresponds to the user selecting at least a first pixel location a second pixel location in the image slice, such as described above in connection with operations 330 and 340.

According to one aspect, the fault path generation module 818 determines the shortest path by performing interpolation, such as described in connection with operation 350 of FIG. 3, to identify the path that is the easiest or least geographically costly path between first and second fault points. Alternatively, the fault path generation module determines the shortest path between two points by using shortest path algorithms, such as described above in reference to FIG. 2.

A modified fault path generation module 820 modifies a previously determined the least cost path or shortest path in response to the entry of one or more additional fault points. For example, the modified fault path generation module modifies the previously determined the least cost path or shortest path as described above in connection with operations 640-650 of FIG. 6.

According to one aspect, the fault path generation module 818 further performs the following processing steps during an automatic interpolation between the previously interpolated fault curves: (1) identify a first image slice and create a first fault curve on that first image slice using the process described above in connection with FIG. 2 and FIG. 3; (2) identify a second image slice that is roughly parallel to the first image slice and create a second fault curve on that second image slice that corresponds to the same fault traced in (1); (3) automatically process a sequence of image slices that are roughly perpendicular to the first and second image slices, such that each of those image slices intersects the first fault curve and second fault curve created in steps (1) and (2), respectively. For each particular slice of the sequence of image slices, the fault path generation module 818 further identifies the intersection of the first fault curve with that particular slice that acts as a first fault point and identifies the intersection of the second fault curve with that particular slice that acts as a second fault point. The fault path generation module 818 then connects these two fault points for that particular slice using the least cost path method described above in connection with FIG. 2 and FIG. 3.

According to another aspect, during an automatic interpolation, the fault path generation module 818 selects which perpendicular planes to process by computing the cost of the path along the smoothly interpolated surface between the first and second fault curves on each perpendicular plane and will only automatically process the sequence of image slices roughly perpendicular to the first and second image slices as described above when the cost along the smooth path exceeds a threshold value.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology.

What is claimed is:

1. A method for performing image-guided fault extraction from a fault-enhanced seismic image using a computer having at least one processor and a display, the fault-enhanced seismic image comprising a plurality of image slices, the method comprising:

displaying on the display of the computer a fault-enhanced seismic image;

receiving a selection of a particular image slice of the plurality of image slices from a user;

displaying on the display of the computer the particular image slice;

receiving a first input designating a first fault point in the particular image slice and receiving a second input designating a second fault point in the particular image slice;

defining a fault path between the first fault point and the second fault point that corresponds to a calculated least cost path that is determined by the processor of the computer, wherein the calculated least cost path between the first fault point and the second fault point is determined based on a comparison of Geodesic distances between data point pairs along each of a plurality of paths between the first fault point and the second fault point and a bias data corresponding to each of the data point pairs along the plurality of pairs; and generating the fault path for display on the display of the computer to show an extracted fault.

2. The method of claim 1 further comprises retrieving the fault-enhanced seismic image from a data source in response to a fault-enhanced seismic image retrieval request from the user.

3. The method of claim 1 further comprising:
receiving a third user input designating a third fault point in the particular image slice between the first fault point and the second fault point;
identifying a modified fault path connecting the first fault point, the second fault point, and the third fault point between that corresponds to a modified calculated least cost path; and
generating the modified fault path identified for display.

4. The method of claim 1 wherein the first input and second input is received from a user.

5. The method of claim 1 wherein the first input and second input is generated automatically by the processor based on image analysis.

6. A system for performing image-guided fault extraction from a fault-enhanced seismic image comprising:
a data source comprising a plurality of a fault-enhanced seismic images, each of the plurality of a fault-enhanced seismic images comprising a plurality of image slices at least one processor; and
an application executed by the at least processor to:
display a selected one of the plurality of fault-enhanced seismic image;
receiving a selection of a particular image slice of plurality of image slices from a user;
display the particular image slice;
receive a first input designating a first fault point in the particular image slice and
receive a second input designating a second fault point in the particular image slice;
identify a fault path between the first fault point and the second fault point that corresponds to a calculated least cost path, wherein the calculated least cost path between the first fault point and the second fault point is determined based on a comparison of geodesic distances between data point pairs along each of a plurality of paths between the first fault point and the second fault point and a bias data corresponding to each of the data point pairs along the plurality of pairs; and
generate the fault path for display to show an extracted fault.

7. The system of claim 6 wherein the application executed by the at least processor is further configured to retrieved the fault-enhanced seismic image from the data source in response to a fault-enhanced seismic image retrieval request from the user.

8. The system of claim 6 wherein the application executed by the at least processor is further configured to:
receive a third user input designating a third fault point in the particular image slice between the first fault point and the second fault point;
identify a modified fault path connecting the first fault point, the second fault point, and the third fault point between that corresponds to a modified calculated least cost path; and
generate the modified fault path identified for display.

9. The system of claim 6 wherein the first input and second input is received from a user.

10. The system of claim 6 wherein the first input and second input is generated automatically by the processor based on image analysis.

11. A method for performing image-guided fault extraction from a fault-enhanced seismic image using a computer having at least one processor and a display, the fault-enhanced seismic image comprising a plurality of image slices, the method comprising:
displaying on the display of the computer a fault-enhanced seismic image;
receiving a selection of a particular image slice of the plurality of image slices from a user;
displaying on the display of the computer the particular image slice;
receiving a first input designating a first fault point in the particular image slice and receiving a second input designating a second fault point in the particular image slice;
defining a fault path between the first fault point and the second fault point that corresponds to a calculated least cost path that is determined by the processor of the computer, wherein the calculated least cost path between the first fault point and the second fault point is determined based on a comparison of geodesic distances between data point pairs along each of a plurality of paths between the first fault point and the second fault point; and
generating the fault path for display on the display of the computer to show an extracted fault.

12. The method of claim 11 further comprising identifying a plurality of paths between the first fault point and the second fault point, each of the plurality of paths comprising multiple pairs of connected data points;
calculating a total geodesic distance associated with each of the plurality of paths by summing an geodesic distance between each pair of connected data points of the multiple pairs of connected data points for each of the plurality of paths;
comparing the total geodesic distances for each of the plurality of paths to identify a particular path that corresponds to a shortest total geodesic distance; and
designating the particular path as the least cost path.

13. The method of claim 11 further comprising
identifying a plurality of paths between the first fault point and second fault point, each of the plurality of paths comprising multiple pairs of connected data points;
calculating a geodesic distance between each pair of connected data points of the multiple pairs of connected data point for each of the plurality of paths;
comparing the geodesic distances for each of the plurality of paths to identify a particular path that corresponds to shortest geodesic distances between each pair of the connected data points; and
wherein the least cost path corresponds to a particular path comprising pairs of connected data points with the shortest geodesic distances.

14. A system for performing image-guided fault extraction from a fault-enhanced seismic image comprising:
a data source comprising a plurality of a fault-enhanced seismic images, each of the plurality of a fault-enhanced seismic images comprising a plurality of image slices at least one processor; and
an application executed by the at least processor to:
display a selected one of the plurality of fault-enhanced seismic image;

receiving a selection of a particular image slice of plurality of image slices from a user;
display the particular image slice;
receive a first input designating a first fault point in the particular image slice and
receive a second input designating a second fault point in the particular image slice;
identify a fault path between the first fault point and the second fault point that corresponds to a calculated least cost path, wherein the calculated least cost path between the first fault point and the second fault point is determined based on a comparison of Geodesic distances between data point pairs along each of a plurality of paths between the first fault point and the second fault point; and
generate the fault path for display to show an extracted fault.

15. The system of claim 14 wherein the application executed by the at least processor is further configured to:
identify a plurality of paths between the first fault point and the second fault point, each of the plurality of paths comprising multiple pairs of connected data points;
calculate a total geodesic distance associated with each of the plurality of paths by summing an geodesic distance between each pair of connected data points of the multiple pairs of connected data points for each of the plurality of paths;
compare the total geodesic distances for each of the plurality of paths to identify a particular path that corresponds to the shortest geodesic distances; and
designate the particular path as the least cost path.

16. The system of claim 14 wherein the application executed by the at least processor is further configured to:
identify a plurality of paths between the first fault point and second fault point, each of the plurality of paths comprising multiple pairs of connected data points;
calculate a geodesic distance between each pair of connected data points of the multiple pairs of connected data point for each of the plurality of paths;
compare the geodesic distances for each of the plurality of paths to identify a particular path that corresponds to the shortest geodesic distances; and
wherein the least cost path corresponds to a particular path comprising pairs of connected data points with the shortest geodesic distances.

* * * * *